United States Patent [19]

Kato et al.

[11] Patent Number: 4,615,747
[45] Date of Patent: Oct. 7, 1986

[54] PROCESS FOR PRODUCING ALUMINUM MATERIAL FOR USE IN VACUUM

[75] Inventors: Yutaka Kato, Ibaraki; Kenji Tsukamoto, Izumiohtsu; Eizo Isoyama, Nara, all of Japan

[73] Assignee: Showa Aluminum Corporation, Sakai, Japan

[21] Appl. No.: 682,456

[22] Filed: Dec. 17, 1984

[30] Foreign Application Priority Data

Dec. 16, 1983 [JP] Japan ................................ 58-238081
Dec. 16, 1983 [JP] Japan ................................ 58-238082

[51] Int. Cl.$^4$ ............................................. C23C 8/12
[52] U.S. Cl. ...................................... 148/6.3; 118/50
[58] Field of Search .................... 156/665; 148/6.3; 134/3

[56] References Cited

U.S. PATENT DOCUMENTS

| | | | |
|---|---|---|---|
| 3,039,910 | 6/1962 | Zelly | 156/665 |
| 3,373,114 | 3/1968 | Grunwald | 156/665 |
| 3,574,681 | 4/1971 | Cecil | 6156/665 |
| 4,149,912 | 4/1979 | Craighead | 148/6.3 |
| 4,426,252 | 1/1984 | Kape | 156/665 |

*Primary Examiner*—Sam Silverberg
*Attorney, Agent, or Firm*—Armstrong, Nikaido, Marmelstein & Kubovcik

[57] ABSTRACT

An aluminum material for use in a vacuum is produced by a process comprising the steps of removing a hydrated oxide coating from the surface of a worked aluminum material to obtain a clean surface in a dry state, and heating the aluminum material in an oxygen gas-containing atmosphere out of contact with the water-containing atmosphere to form an oxide coating on the dry clean surface.

17 Claims, No Drawings

4,615,747

PROCESS FOR PRODUCING ALUMINUM MATERIAL FOR USE IN VACUUM

BACKGROUND OF THE INVENTION

The present invention relates to an aluminum material which is useful for the particle accelerating pipes (beam lines) of accelerators such as synchrotrons and also for other vacuum apparatus such as film producing apparatus, surface analyzing apparatus and nuclear fusion apparatus.

The term "aluminum" as used herein and in the appended claims includes pure aluminum and all aluminum alloys. Further the term "inert gas" includes argon gas and helium gas on the Periodic Table and also nitrogen gas which is inert to aluminum.

While stainless steel has been chiefly used for producing particle accelerating pipes, aluminum has been found suitable for this application recently and placed into use, because as compared with stainless steel, aluminum is less likely to produce induced radioactivity which, even if emitted, decays more rapidly, and further because aluminum has higher thermal and electrical conductivities and is lower in the gas release rate of the surface, more lightweight and and better in workability. The interior of the particle accelerating pipe must be maintained in a high vacuum in order to pass particles at a high velocity. Accordingly the performance of the pipe is dependent on how to maintain a high vacuum within the pipe. Furthermore, although stainless steel was used also for the lining plate of the vaccum chamber of the above-mentioned film producing apparatus, aluminum has been introduced into use for the plate because aluminum is lower in the gas release rate of its surface, more lightweight and better in workability. It is also necessary to maintain a high vacuum within the vacuum chamber of the apparatus in order to produce a film therein free from impurities. The vacuum portions of other vacuum apparatus also require a high vacuum as desired.

To produce a high vacuum within the particle accelerating pipe or the vacuum portion of other vacuum apparatus, it is conventional practice to degrease with an organic solvent or the like the inner surface of the pipe or the surface of aluminum material facing the vacuum portion and thereafter heating the surface at about 150° C. for about 24 hours for degassing, in combination with discharge cleaning in hydrogen gas, argon gas or the like when so desired. Such a procedure, however, requires a long period of time, is inefficient and is not fully satisfactory in creating a high vacuum within the vacuum portion.

In order to maintain a high vacuum within the vacuum portion of the vacuum apparatus, it is important to reduce the amount of gas to be released from the surface of aluminum material as a product and facing the vacuum portion. In this respect, we carried out experiments and research and conceived that the state of the coating on the surface of aluminum material greatly influences the degree of vacuum.

As is well known, aluminum is a metal which is very prone to oxidation, and an oxide coating is formed over the surface when it is brought into contact with oxygen. Further when aluminum is allowed to stand in the presence of water or moisture, a hydrated oxide coating is formed over the surface. The hydrated oxide coating grows more remarkably if the temperature of the hydrated oxide coating forming reaction is higher. In an environment of high temperature, a coating of hydrated oxide, such as boemite (quasi-boemite) or bialite, is formed on the surface of aluminum. Unlike the aluminum oxide coating which is formed in the absence of water, such a hydrated oxide coating is very coarse and porous and has a complexly intricate texture. Additionally, the coating has a large thickness.

The aluminum material produced by the usual extrusion process has a hydrated oxide surface coating which is formed by the contact of aluminum with water-containing atmosphere (oxygen) during extrusion. During the production process, moreover, the aluminum material is exposed to a high temperature, which accelerates the hydrated oxide coating forming reaction to form a coating of large thickness. The thick hydrated oxide coating is porous as mentioned above and therefore adsorbs a large amount of water. Further after the production of the aluminum material, the coating, which is not compact, adsorbs vacuum reducing substances, such as water, hydrocarbons, carbon dioxide and carbon monoxide, which are present in the atmosphere. Since the coating has the above characteristics, these substances become incorporated into the coating. Consequently, it becomes difficult to remove the substances even when the coating is exposed to a vacuum. The presence of these substances appear responsible for the difficulty encountered in giving an improved degree of vacuum with use of aluminum material. Further, to give enhanced mechanical strength to the aluminum material formed, the material is heated at a high temperature and then cooled with water and air for hardening or heat treatment. During this treatment, the hydrated oxide coating formed during the production process further grows, while the vacuum reducing substances already adsorbed become incorporated into the coating.

The plate and foil materials which are formed by rolling have adhered to the surface the rolling oil which is a vacuum reducing substance and further have a porous hydrated oxide coating formed during annealing. Press-formed products also have adhered thereto a processing oil which is a vacuum reducing substance.

Aluminum materials for vacuum apparatus include a hollow aluminum extrusion material useful for particle accelerating pipes for synchrotron and like accelerators. We have already proposed a process for producing such aluminum extrusion material which process is characterized in that the inner surface of the material is held out of contact with air (Published Examined Japanese Patent Application No. SHO 59-19769). Although suited to hollow extrusion materials, this process is not applicable to the plate, foil and like materials to be produced by rolling, press-formed products and solid extrusion materials.

SUMMARY OF THE INVENTION

An object of the present invention is to provide a process for producing an aluminum material which is free of the foregoing problems and suitable for use in a high vacuum.

According to the process of the invention for producing an aluminum material for use in a vacuum, a compact oxide coating is formed on the surface of the aluminum material instead of the objectionable hydrated oxide coating. As compared with the hydrated oxide coating, the oxide coating is much less likely to adsorb or incorporate vacuum reducing substances, which, even if adsorbed or incorporated, can be easily removed by a degassing treatment. Accordingly when the material is used for a vacuum apparatus to face its vacuum portion, the amounts of vacuum reducing substances released into the vacuum portion are very small, permitting the portion to retain a high vacuum. This serves to lessen or eliminate the cumbersome work conventionally needed for establishing a high vacuum. The compact oxide coating formed on the surface of the aluminum material prevents adsorption of vacuum reducing substances and inhibits a hydrated oxide coating even if the material is subsequently exposed to the atmosphere.

DETAILED DESCRIPTION OF THE INVENTION

The process of the present invention comprises the steps of removing a hydrated oxide coating from the surface of a worked aluminum material to obtain a clean surface in a dry state, and heating the aluminum material in an oxygen gas-containing atmosphere out of contact with the water-containing atmosphere to form an oxide coating on the dry clean surface.

Examples of useful worked aluminum materials are bars, plates, foils and otherwise shaped materials produced by extrusion, rolling, press forming and the like, and press-formed products.

The hydrated oxide coating can be removed from the surface of the worked aluminum material to obtain a clean surface, for example, by the following three methods.

The first is the method of cleaning or pickling the surface with an alkali to wash the processing oil away and remove the hydrated oxide coating from the aluminum surface. Caustic soda, for example, is used as the alkali.

The second is the method of pickling the surface with an acid to wash the processing oil away and remove the hydrated oxide coating from the surface. Sulfuric acid, for example, is used as the acid.

The third is dry etching. Examples of useful dry etching methods are discharge cleaning, reactive gas etching, plasma etching, reactive ion etching, reactive ion beam etching, ion beam etching, reactive laser beam etching, etc.

In the case of the first or second method, the surface etched with an alkali or acid needs to be positively dried. The etched surface is dried in a vacuum atmosphere or inert gas atmosphere, preferably in a vacuum atmosphere because the etched material can be dried by being subjected to a vacuum in a vacuum oven. The material is dried in the temperature range of from room temperature to 120° C., preferably 50° to 90° C., because if the drying temperature is above 120° C., it is likely that a hydrated oxide coating will be formed during drying. When the first or second method is used, it is preferable that the material etched with an alkali or acid be immersed, before drying, in a treating solution for inhibiting the formation of hydrated oxide coating. For the inhibition of hydrated oxide coating, an aqueous solution is used which contains at least one of silicic acid, chromic acid, vanadic acid, zirconic acid, phosphoric acid (polyphosphoric acid), permanganic acid, tungstic acid, molybdic acid and salts of these acids. The solute concentration of the treating solution is 0.0000001 to 5 wt. %, preferably 0.0000001 to 0.005 wt. %. When the third method is resorted to, the aluminum material remains dry and therefore need not be dried positively.

Useful oxygen gas-containing atmospheres which are held out of contact with the atmosphere containing water include the following three examples.

The first is a mixed gas atmosphere containing 0.5 to 30 vol. %, preferably 1 to 10 vol. %, of oxygen, the balance being an inert gas. Examples of generally useful inert gases are argon, helium and nitrogen gases.

The second is an inert gas atmosphere containing oxgen gas as an impurity. Commercial inert gases or those obtained industrially contain a very small amount of oxygen as an impurity.

The third is a vacuum atmosphere containing a very small amount of oxygen. The degree of vacuum of this atmosphere is such that it is easily obtained industrially.

When the aluminum material is heated in one of these three atmospheres, the material is heated at a temperature of 120° to 500° C., preferably 200° to 300° C., for 0.1 to 24 hours, preferably 0.5 to 6 hours. The heating treatment at 200° to 300° C. serves also as an aging treatment for heat-treating aluminum alloys or as a stabilizing treatment for aluminum alloys for non-heat-treating use. When the heating temperature is below 120° C. a stable oxide coating will not be obtained, whereas if the temperature exceeds 500° C., the amorphous oxide coating partially crystallizes, permitting such crystals to be present in the coating, with the resulting likelihood that a compact coating will not be formed.

When heated in any of these three atmospheres, the aluminum material is held out of contact with the atmosphere which contains water, so that no hydrated oxide coating will be formed on its surface. Consequently a thin compact oxide coating is formed on the active aluminum surface. The heating method wherein the first atmosphere is used produces an oxide coating which is 20 to 60 angstroms in thickness. Heating in the second methods gives a thinner coating. The heating method with use of the third atmosphere involves difficulty in controlling the dew point, so that the use of first or second atmsophere is preferred.

EXAMPLE 1

A rolled plate of A1070 was immersed in an aqueous solution containing 5 wt. % of sodium hydroxide at a bath temperature of 50° C. for 2 minutes to remove a hydrated oxide coating from the surface of the rolled plate and obtain a clean surface. The plate was then immersed in an aqueous solution containing 10 p.p.m. of chromic acid at a bath temperature of 30° C. for 30 seconds. Subsequently the plate was heated in a vacuum at 80° C. for 30 minutes to dry the surface. The plate was thereafter heated in a mixed gas atmosphere comprising 5 vol. % of oxygen and the balance argon at 250° C. for 4 hours.

A compact oxide coating, about 40 angstroms in thickness, was formed on the surface of the rolled plate. When checked for gas release rate by heating for degassing, the plate exhibited a satisfactory value of $5 \times 10^{-14}$ torr.l/s.cm$^2$.

EXAMPLE 2

A rolled plate of A1100 was subjected to discharge cleaning (glow discharge) with use of argon gas to remove a hydrated oxide coating from the plate surface and obtain a clean surface. The plate was thereafter heated in a mixed gas atmosphere, comprising 10 vol. % of oxygen and the balance argon, at 270° C. for 4 hours.

A compact oxide coating, about 40 angstroms in thickness, was formed on the surface of the rolled plate. When checked for gas release rate by heating for degassing, the plate exhibited a satisfactory value of $2\times 10^{-13}$ torr.l/s.cm$^2$.

EXAMPLE 3

A rolled plate of A5083 was immersed in an aqueous solution contaning 5 wt. % of sodium hydroxide at a bath temperature of 50° C. for 2 minutes to remove a hydrated oxide coating from the surface and obtain a clean surface. The plate was then heated in a vacuum at 80° C. for 30 minutes to dry the surface. The plate was thereafter heated in a mixed gas atmosphere, comprising 5 vol. % of oxygen and the balance argon, at 250° C. for 4 hours.

A compact oxide coating, about 50 angstroms in thickness, was formed on the plate surface. When the plate was checked for gas release rate by heating for degassing, the value was as satisfactory as $2\times 10^{-13}$ torr.l/s.cm$^2$.

EXAMPLE 4

A rolled plate of A5083 was immersed in an aqueous solution containing 10 vol. % of sulfuric acid at a bath temperature of 70° C. for 2 minutes to remove a hydrated oxide coating from the surface of the plate and obtain a clean surface. The plate was then immersed in an aqueous solution containing 10 p.p.m. of ammonium vanadate at a bath temperature of 30° C. for 30 seconds. Subsequently the plate was heated in a vacuum at 80° C. for 30 minutes to dry the surface. The plate was thereafter heated in a mixed gas atmosphere, comprising 5 vol. % of oxygen and the balance argon, at 250° C. for 4 hours.

A compact oxide coating, about 40 angstroms in thickness, was formed on the surface of the rolled plate. When the plate was checked for gas release rate by heating for degassing, the value was as satisfactory as $1\times 10^{-13}$ torr.l/s.cm$^2$.

EXAMPLE 5

A rolled plate of A1100 was immersed in an aqueous solution containing 5 wt. % of sodium hydroxide at a bath temperature of 50° C. for 2 minutes to remove a hydrated oxide coating from the plate surface and obtain a clean surface. The plate was then immersed in an aqueous solution containing 10 p.p.m. of chromic acid at a bath temperature of 30° C. for 30 seconds and was subsequently heated in an inert gas atmosphere at 80° C. for 30 minutes to dry the surface. The plate was thereafter heated in an inert gas atmosphere containing 0.5 p.p.m. of oxygen as an impurity at 250° C. for 4 hours.

A compact oxide coating, about 30 angstroms in thickness, was formed on the surface of the rolled plate. When the plate was checked for gas release rate by heating for degassing, the value was as satisfactory as $1\times 10^{-13}$ torr.l/s.cm$^2$.

EXAMPLE 6

A rolled plate of A5083 was immersed in an aqueous solution containing 5 wt. % of sodium hydroxide at a bath temperature of 50° C. for 2 minutes to remove a hydrated oxide coating from the surface of the plate and obtain a clean surface. The plate was then immersed in an aqueous solution containing 10 p.p.m. of chromic acid at a bath temperature of 30° C. for 30 seconds and subsequently heated in a vacuum at 80° C. for 30 minutes to dry the surface. The plate was thereafter heated in a vacuum atmosphere of $5\times 10^{-5}$ torr in vacuum degree at 250° C. for 4 hours.

A compact oxide coating, about 30 angstroms in thickness, was formed on the surface of the rolled plate. When the plate was heated for degassing to determine the gas release rate, the value was as satisfactory as $1\times 10^{-13}$ torr.l/s.cm$^2$.

EXAMPLE 7

A rolled plate of A1100 was cleaned by discharge (blow discharge) with use of argon gas to remove a hydrated oxide coating from the plate surface and obtain a clean surface. The plate was then heated in an inert gas atmosphere containing 0.5 p.p.m. of oxygen as an impurity at 270° C. for 4 hours.

A compact oxide coating, about 40 angstroms in thickness, was formed on the surface of the plate. When the plate was checked for gas release rate by heating for degassing, the value was as satisfactory as $1\times 10^{-13}$ torr.l/s.cm$^2$.

EXAMPLE 8

A rolled plate of A1100 was treated by discharge cleaning (glow discharge) with use of argon gas to remove a hydrated oxide coating from the plate surface and obtain a clean surface. The plate was then heated in a vacuum atmosphere having a vacuum degree of $5\times 10^{-5}$ torr at 270° C. for 4 hours.

A compact oxide coating, about 30 angstroms in thickness, was formed on the plate surface. When the plate was checked for gas release rate by heating for degassing, the value was as satisfactory as $1\times 10^{-13}$ torr.l/s.cm$^2$.

What is claimed is:

1. A process for producing an aluminum material for use in a vacuum comprising the steps of removing a hydrated oxide coating from the surface of a worked aluminum material to obtain a clean surface in a dry state, and heating the aluminum material in an oxygen gas-containing atmosphere out of contact with a water-containing atmosphere to form an oxide coating on the dry clean surface.

2. A process as defined in claim 1 wherein the dry clean surface is obtained by dry-etching the suface of the worked aluminum material.

3. A process as defined in claim 1 wherein the dry clean surface is obtained by subjecting the surface of the worked aluminum material to alkaline pickling and thereafter drying the surface.

4. A process as defined in claim 3 wherein the pickled aluminum material is immersed, before the drying, in an aqueous solution containing at least one of chromic acid, silicic acid, vanadic acid, zirconic acid, phosphoric acid, permanganic acid, tungstic acid, molybdic acid and salts of these acids, whereby the material is treated for the inhibition of hydrated oxide coating.

5. A process as defined in claim 3 wherein the pickled surface is dried in a vacuum atmosphere.

6. A process as defined in claim 3 wherein the pickled surface is dried in an inert gas atmosphere.

7. A process as defined in claim 3 wherein the pickled surface is dried in the temperature range of from room temperature to 120° C.

8. A process as defined in claim 1 wherein the dry clean surface is obtained by subjecting the surface of the worked aluminum material to acid pickling and thereafter drying the surface.

9. A process as defined in claim 8 wherein the pickled aluminum material is immersed, before the drying, in an aqueous solution containing at least one of chromic acid, silicic acid, vanadic acid, zirconic acid, phosphoric acid, permanganic acid, tungstic acid, molybdic acid and salts of these acids, whereby the material is treated for the inhibition of hydrated oxide coating.

10. A process as defined in claim 8 wherein the pickled surface is dried in a vacuum atmosphere.

11. A process as defined in claim 8 wherein the pickled surface is dried in an inert gas atmosphere.

12. A process as defined in claim 8 wherein the pickled surface is dried in the temperature range of from room temperature to 120° C.

13. A process as defined in claim 1 wherein the oxygen gas-containing atmosphere is a mixed gas atmosphere containing 0.5 to 30 vol. % of oxygen gas, the balance being an inert gas.

14. A process as defined in claim 1 wherein the oxygen gas-containing atmosphere is an inert gas atmosphere containing oxygen gas as an impurity.

15. A process as defined in claim 1 wherein the oxygen gas-containing atmosphere is a vacuum atmosphere containing remaining oxygen.

16. A process for producing an aluminum material for use in a vacuum comprising the steps of dry-etching the surface of a worked aluminum material to obtain a dry clean surface free from a hydrated oxide coating, and heating the aluminum material in an oxygen-containing atmosphere out of contact with a atmosphere containing water to form an oxide coating on the dry clean surface.

17. A process for producing an aluminum material for use in a vacuum comprising the steps of cleaning the surface of a worked aluminum material to remove a hydrated oxide coating from the surface and obtain a clean surface, drying the clean surface, and heating the aluminum material in an oxygen-gas containing atmosphere out of contact with a atmosphere containing water to form an oxide coating on the dry clean surface.

* * * * *